United States Patent
Goldstein et al.

(10) Patent No.: US 7,042,999 B2
(45) Date of Patent: May 9, 2006

(54) METHOD AND SYSTEM FOR PROVIDING DIRECT ROUTING OF LOCAL NUMBER PORTABILITY (LNP) CALLS TO ALTERNATE TERMINATIONS

(75) Inventors: Todd A. Goldstein, Colorado Springs, CO (US); Roger N. Tucker, Colorado Springs, CO (US)

(73) Assignee: MCI, LLC., Basking Ridge, NJ (US)

( * ) Notice: Subject to any disclaimer, the term of this patent is extended or adjusted under 35 U.S.C. 154(b) by 0 days.

(21) Appl. No.: 10/645,071

(22) Filed: Aug. 21, 2003

(65) Prior Publication Data

US 2005/0041795 A1    Feb. 24, 2005

(51) Int. Cl.
*H04M 7/00*    (2006.01)
(52) U.S. Cl. ............................. 379/220.01; 379/221.01
(58) Field of Classification Search ................ 379/219, 379/221.13
See application file for complete search history.

(56) References Cited

U.S. PATENT DOCUMENTS

| | | | | |
|---|---|---|---|---|
| 5,475,749 A | * | 12/1995 | Akinpelu et al. | 379/221.02 |
| 5,661,792 A | * | 8/1997 | Akinpelu et al. | 379/221.13 |
| 6,798,772 B1 | * | 9/2004 | Bergman et al. | 370/354 |
| 2003/0128691 A1 | * | 7/2003 | Bergman et al. | 370/352 |

* cited by examiner

*Primary Examiner*—Creighton Smith (57) ABSTRACT

An approach for processing a call over a telecommunications system is disclosed. A call processor (e.g., a Service Control Point (SCP)) communicates with a switch to provide an alternative route for a call, received by the switch, that is determined to be a local portability number (LNP). A database coupled to the call processor stores the alternative routes associated with the LNP call; at least one of the alternative routes specifies a route that bypasses a local exchange network capable of terminating the call, whereby local access charges are avoided.

28 Claims, 4 Drawing Sheets

METHOD AND SYSTEM FOR PROVIDING DIRECT ROUTING OF LOCAL NUMBER PORTABILITY (LNP) CALLS TO ALTERNATE TERMINATIONS

FIELD OF THE INVENTION

The present invention relates to a communications system, and is more particularly related to routing of calls.

BACKGROUND OF THE INVENTION

Among the many types of telecommunication services, a common carrier (e.g., interexchange carrier) can supply toll services (i.e., "long distance" services), whereby a call is transported over the network of the carrier generally from one Local Access and Transport Area (LATA) to another. Currently, most Public Switched Telephone Network (PSTN) type phone calls traversing the carrier's long-distance network are terminated via a Local Exchange Carrier (LEC), such as the Regional Bell Operating Companies (RBOCs), or other local exchange carriers (CLECs) in the United States or abroad. These Local Exchange Carriers terminate the calls transported by the carriers. For use or access to their networks, the LECs charge termination access fees (i.e., egress charge). Given the volume of the calls carried by the long distance carriers, these access fees constitute a significant expense for these carriers. The intense competition among common carriers provides a continual drive to seek more cost effective approaches to providing telecommunication services.

As mandated by law (Telecommunications Act of 1996), Local Number Portability (LNP) has been introduced to further open up competition in the common carrier market. LNP is the ability of users of telecommunications services to retain, at the same location, existing telecommunications numbers without impairment of quality, reliability, or convenience when switching from one telecommunications carrier to another. Conventionally, LNP calls are processed using Local Routing Numbers (LRNs). LNP and LRNs are supervised by the Number Portability Administration Center under the auspices of the Federal Communications Commission (FCC). When a customer changes their local service provider, the Number Portability Administration Center assigns a new LRN to the telephone number that is being ported. The new LRN is obtained by the common carrier when a call is placed to the ported number to properly route the call. During processing of a LNP call, the LRN associated with the customer is obtained using a Service Control Point (SCP) to properly route the call over the network of the new local service provider. Thus, if the customer changes to yet another local exchange carrier, only the LRN changes. LNP processing in this manner is industry mandated.

Given the traditional approach for supporting LNP, local access fees are incurred by a long distance service provider (or interexchange carrier) when the calls are terminated to the LECs. That is, terminating Direct Distance Dialing (DDD) calls within a LEC network entails a charge to the long distance service provider. These access charges represent the single largest expense for the interexchange carrier, and have a direct impact on profitability. Moreover, the customers pay for circuits to the LECs, depending on the amount of incoming traffic received from the particular LEC.

Therefore, there is a need for an approach to provide alternate terminations of PSTN type calls to more efficiently utilize the resources of the network, while reducing operational costs.

SUMMARY OF THE INVENTION

These and other needs are addressed by the present invention in which an approach is provided for directly terminating local number portability (LNP) calls. It is recognized that many carrier networks support direct termination of calls to their customers using Dedicated Access Lines (DALs). However, only a fraction of the traffic originating from DALs terminate down DALs, in that a dial plan needs to be set up for the call originator. Further, conventionally, there exists no mechanism for routing Local Number Portability (LNP) calls, which constitute a large volume of calls placed by customers, using these DAL services; this is so because LNP to DAL translation does not exist. It is recognized that service providers (e.g., interexchange carriers) conventionally utilize standardized Local Routing Number (LRN) processing to route LNP calls, which strictly terminate over a local exchange carrier (LEC) network. Rather than route traffic through the LEC, an approach is provided to utilize a call processor (e.g., service control point (SCP)) for performing LNP translations to direct a switch to route such calls directly from the switch to the termination—for customers that have direct access to the interexchange carrier ("long-distance") network. If the direct termination (e.g., Dedicated Access Line (DAL), a wireless communication channel, an Internet Protocol (IP) connection—e.g., a Voice over IP session, or a cable communication channel) is unavailable, then the call processor can instruct the switch to perform overflow routing of the call to the LEC, as is the result of the standard LRN processing. It is noted that the alternative routes can be iteratively attempted, resulting in the overflow route to the LEC if these alternative routes are unavailable. The above approach advantageously reduces or eliminates local access fees. Also, the number of circuits to the LEC could be reduced if more of the traffic were routed from the long-distance switch directly to the customer, resulting in cost savings for the customer and greater efficiency for the service provider. In addition, the network can better utilize the existing DALs.

In one aspect of the present invention, a method of processing a call is disclosed. The method includes receiving a query from a switch for an instruction for terminating the call. The method also includes determining whether the call is a local number portability (LNP) call. The method further includes, if the call is a LNP call, selectively instructing, in response to the query, the switch to terminate the call without incurring a local access charge for the call assessable by a local carrier capable of terminating the call.

In another aspect of the present invention, a computer-readable medium carrying one or more sequences of one or more instructions for processing a call is disclosed. The one or more sequences of one or more instructions include instructions which, when executed by one or more processors, cause the one or more processors to perform the step of receiving a query from a switch for an instruction for terminating the call. Another step includes determining whether the call is a local portability number (LNP) call. A further step includes, if the call is a LNP call, selectively instructing, in response to the query, the switch to terminate the call without incurring a local access charge for the call assessable by a local carrier capable of terminating the call.

In another aspect of the present invention, a method for routing a call over an interexchange carrier network is disclosed. The method includes receiving the call destined for a station directly reachable by the interexchange carrier network. The method also includes transmitting a query to a call processor configured to provide service intelligence relating to the call, the query requesting information for routing the call to the station, wherein the call processor determines that the call is a local portability number (LNP) call. Further, the method includes receiving a response to the query from the call processor, the response containing the routing information for selectively bypassing a local exchange carrier network serving the station.

In another aspect of the present invention, a computer-readable medium carrying one or more sequences of one or more instructions for routing a call over an interexchange carrier network is disclosed. The one or more sequences of one or more instructions include instructions which, when executed by one or more processors, cause the one or more processors to perform the step of receiving the call destined for a station directly reachable by the interexchange carrier network. Another step includes transmitting a query to a call processor configured to provide service intelligence relating to the call, the query requesting information for routing the call to the station, wherein the call processor determines that the call is a local portability number (LNP) call. A further step includes receiving a response to the query from the call processor, the response containing the routing information for selectively bypassing a local exchange carrier network serving the station.

In another aspect of the present invention, a system for call processing is disclosed. The system includes a call processor communicating with a switch and being configured to provide an alternative route for a call, received by the switch, that is determined to be a local portability number (LNP). The system also includes a database coupled to the call processor for storing the alternative route among a plurality of alternative routes associated with the LNP call, the alternative route specifying bypass of a local exchange network capable of terminating the call.

In another aspect of the present invention, a system for processing a call is disclosed. The system includes means for communicating with a switch and being configured to provide an alternative route for a call, received by the switch, that is determined to be a local portability number (LNP). The system also includes means for storing the alternative route among a plurality of alternative routes associated with the LNP call, the alternative route specifying bypass of a local exchange network capable of terminating the call.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for routing a Local Number Portability (LNP) call over an interexchange carrier network to minimize access charges assessable by local exchange carriers are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is explained with respect to Dedicated Access Lines as a termination method, other direct termination methods (e.g., wireless, Voice over IP (Internet Protocol), cable, etc.) can be employed.

Figure 1:
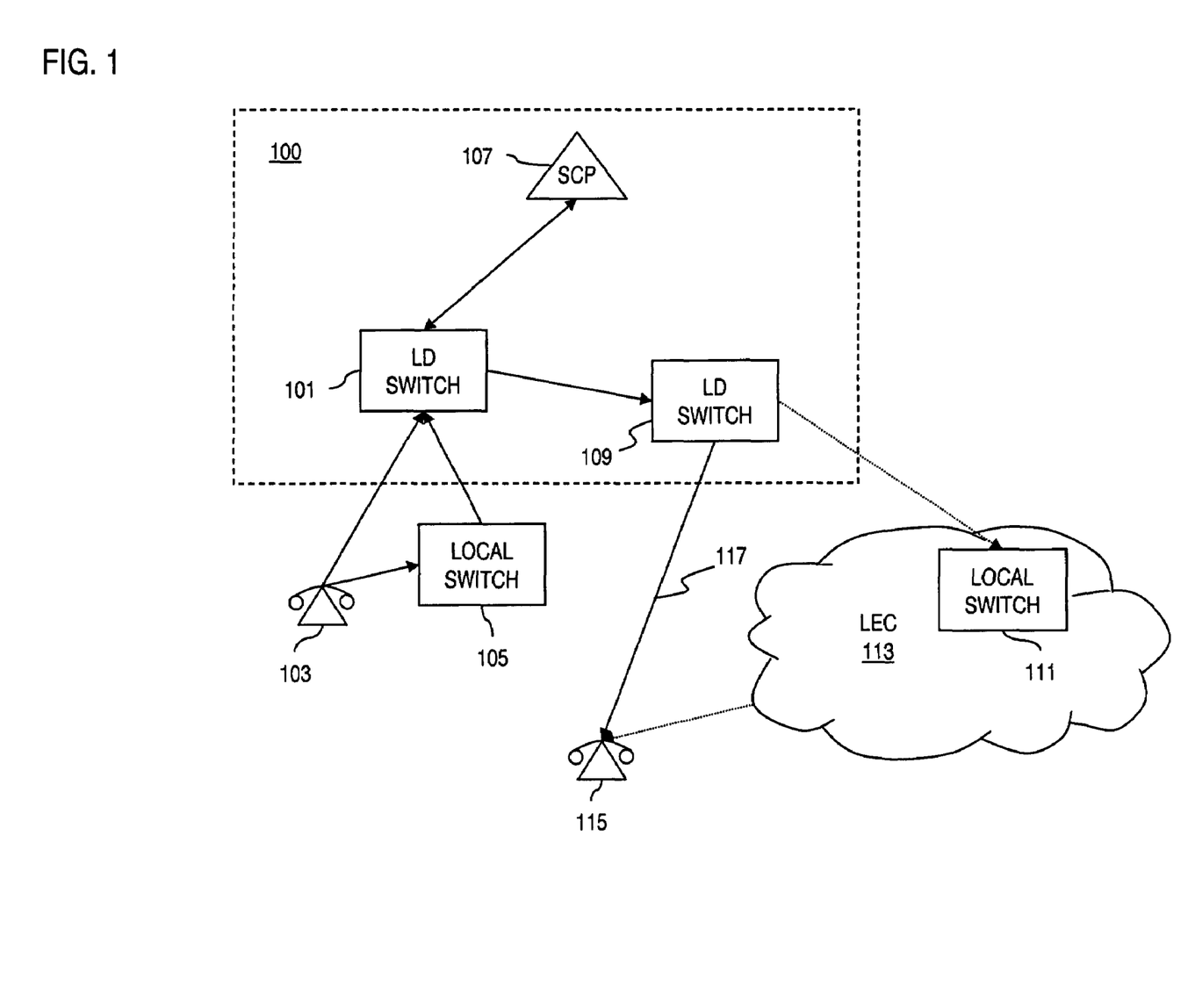
FIG. 1 is a diagram of a communication system capable of providing alternate routing of calls via a Service Control Point (SCP), according to an embodiment of the present invention.

FIG. 1 is a diagram of a communication system capable of providing alternate routing of calls via a Service Control Point (SCP), according to an embodiment of the present invention. For the purposes of explanation, the present invention is described in the context of toll (or long distance) services. In an exemplary embodiment, an interexchange carrier network 100 is an Advanced Intelligent Network (AIN), which is an open standard architecture that separates signaling traffic from call traffic. This decoupling provides great flexibility in terms of equipment deployment and service development. Developed by Bell Communications Research, the AIN standards and concepts have also been adopted by the International Telecommunications Union (ITU) in a form referred to as Capability Set 1 (CS-1), for example.

The interexchange carrier network 100, in an exemplary embodiment, includes a long distance (LD) switch 101 for receiving calls originating directly from a telephone system or station 103 or through a local switch 105 by the telephone station 103. The network 100 also includes a Service Control Point (SCP) 107 in communication with the LD switch 101 for providing routing instructions for calls received by the LD switch 101; the signaling between the SCP 107 and the LD switch 101 conforms, for example, with the Signaling System 7 (SS7) or other protocols such as Application Data Field (ADF), Transmission Control Protocol/Internet Protocol (TCP/IP), and X.25. The SCP 107 may support other services, such toll-free services, card services, private dialing, and etc. As the service logic, the SCP 107 provides translation and routing functions.

In this example, LD switch 109 is an egress switch, which accesses a local switch 111 of a Local Exchange Carrier (LEC) network 113. The LD switch 109 of the interexchange carrier can terminate directly via a communication path 117 to a station 115 or via the LEC 113. In an exemplary embodiment of the present invention, the path 117 represents a private tie trunk or switch and trunk termination, such as a Dedicated Access Line (DAL). Alternatively, the path 117 can be implemented as a wireless communication channel, an Internet Protocol (IP) connection (e.g., a VoIP session), or a communication channel supported by a cable network, or other communication mechanisms.

It is noted that the station 115 can be behind a Private Branch Exchange (PBX) (not shown). Although the station 115 is shown as an individual telephone station, it is contemplated that the station 115 can be any telephony capable device (e.g., VoIP computer or device).

According to one embodiment of the present invention, the network 100 provides alternate terminations as a part of SCP processing of the industry mandated LNP, to terminate calls in the most efficient/least cost manner, using dedicated access links, as well as other forms of termination processing.

The SCP 107, in an exemplary embodiment, employs LNP processing to return alternate terminations other than an LRN. Theses alternate terminations, which are stored within a database of the SCP 107, can be used to bypass the LEC 113 to avoid termination access fees, or be used for other purposes. If the alternate routing fails, the use of overflow (Network Call Redirect) to route traffic via DDD/PSTN using standard LRN.

Because the SCP 107 largely directs the switch 101 to terminate more calls down DALs 117 (except in the case of overflow processing, as discussed in FIG. 3 below), access charge fees for the interexchange carrier of the network 100 are minimized.

Figure 2:
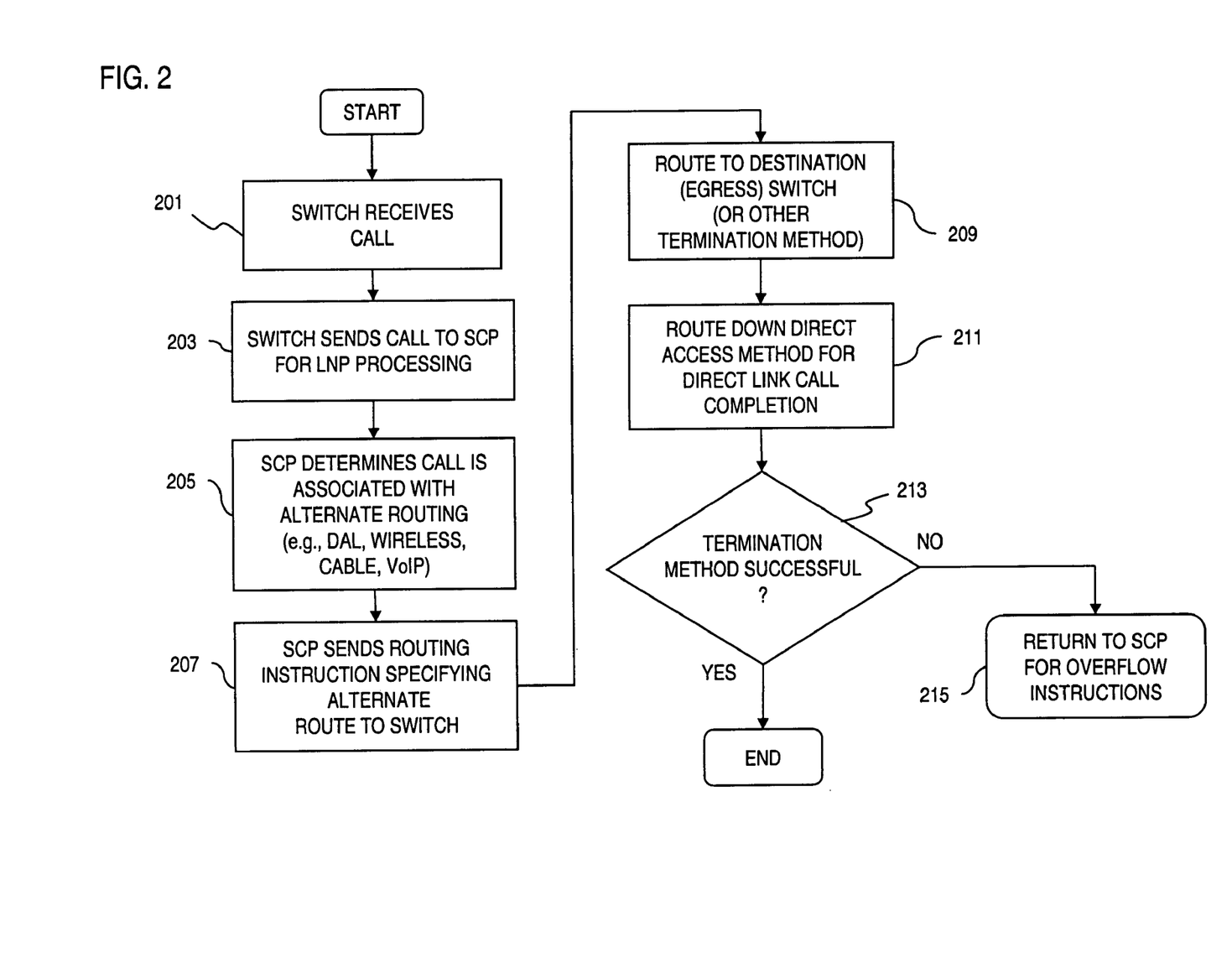
FIG. 2 is a flowchart of a process for terminating local number portability (LNP) calls using alternate routes, according to an embodiment of the present invention.

FIG. 2 is a flowchart of a process for terminating local number portability (LNP) calls using alternate routes, according to an embodiment of the present invention. In step 201, the LD switch 101 receives a call from the station 103 over a DAL, through the local switch 105, or other access methods. The LD switch 101, as in step 203, sends the call to the SCP 107 for LNP processing. In step 205, the SCP 107 recognizes the destination number in its database, which stores alternate routes, such as direct termination to the destination station 115. In response to the query from the switch 101, the SCP 107 sends routing instructions to the switch 101 on how to terminate the call (per step 207). The LD switch 101 then routes the call to the destination (or egress) switch 109, according to the specified routing method, as in step 209. In step 211, the call is routed according to the selected direct access method (e.g., DAL) designated by the SCP 107 to reach the station 115. Next, the LD switch 101 determines whether the termination method is successful—e.g., the DAL is available, per step 213. If the termination is successful, then the call is completed. However, if the call cannot be terminated (e.g., DAL is busy), then the LD switch 101 returns to the SCP 107 for overflow instructions (as in step 215). The overflow routing process is detailed below with respect to FIG. 3.

Figure 3:
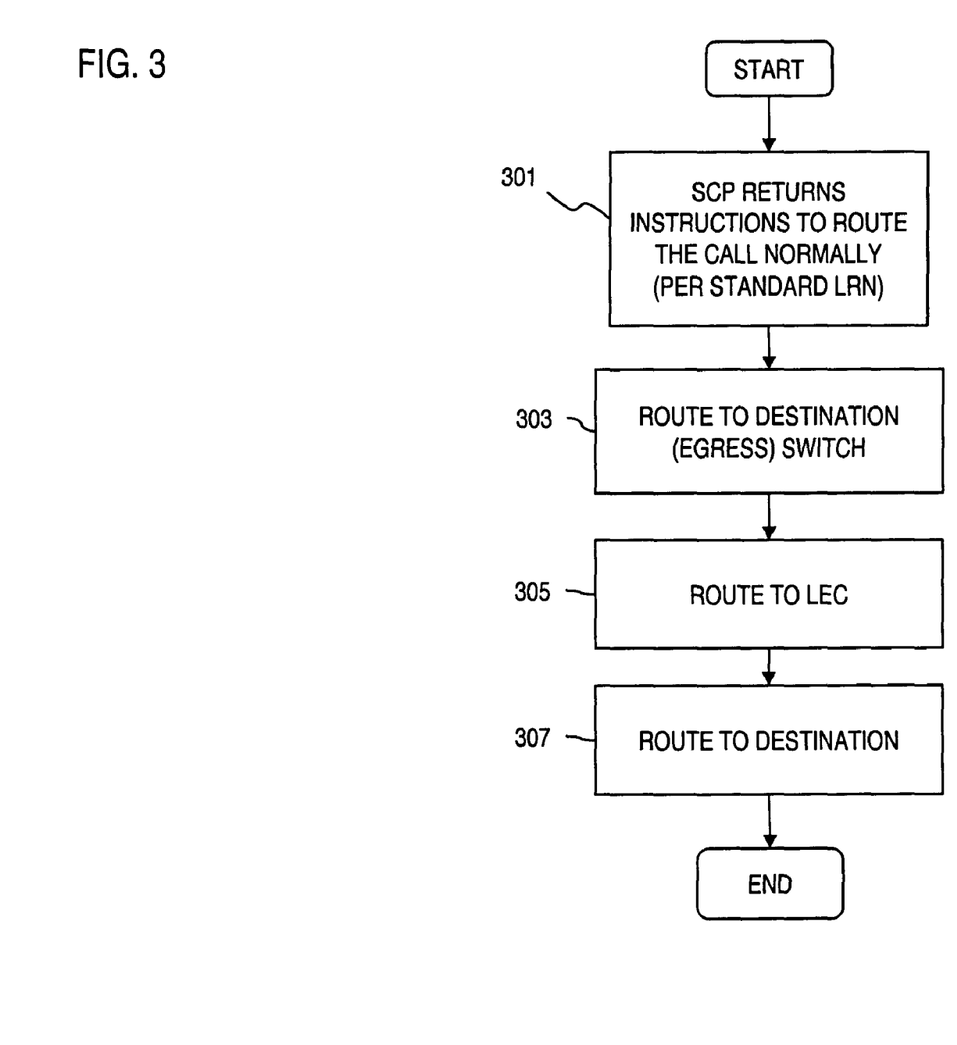
FIG. 3 is a flowchart of a process for overflow routing of LNP calls, according to an embodiment of the present invention.

FIG. 3 is a flowchart of a process for overflow routing of LNP calls, according to an embodiment of the present invention. In step 301, the SCP 107 returns instructions to route to another destination or to route the call as traditionally performed for LNP. That is, the SCP 107 checks for LRN to route the call to the LEC network 113 via the local switch 111. In step 303, the call is routed to the destination (or egress) switch 109, which forwards the call to the local switch 111 of the LEC network 113 (per step 305). Finally, the call is routed to the destination station 115, per step 307.

Figure 4:
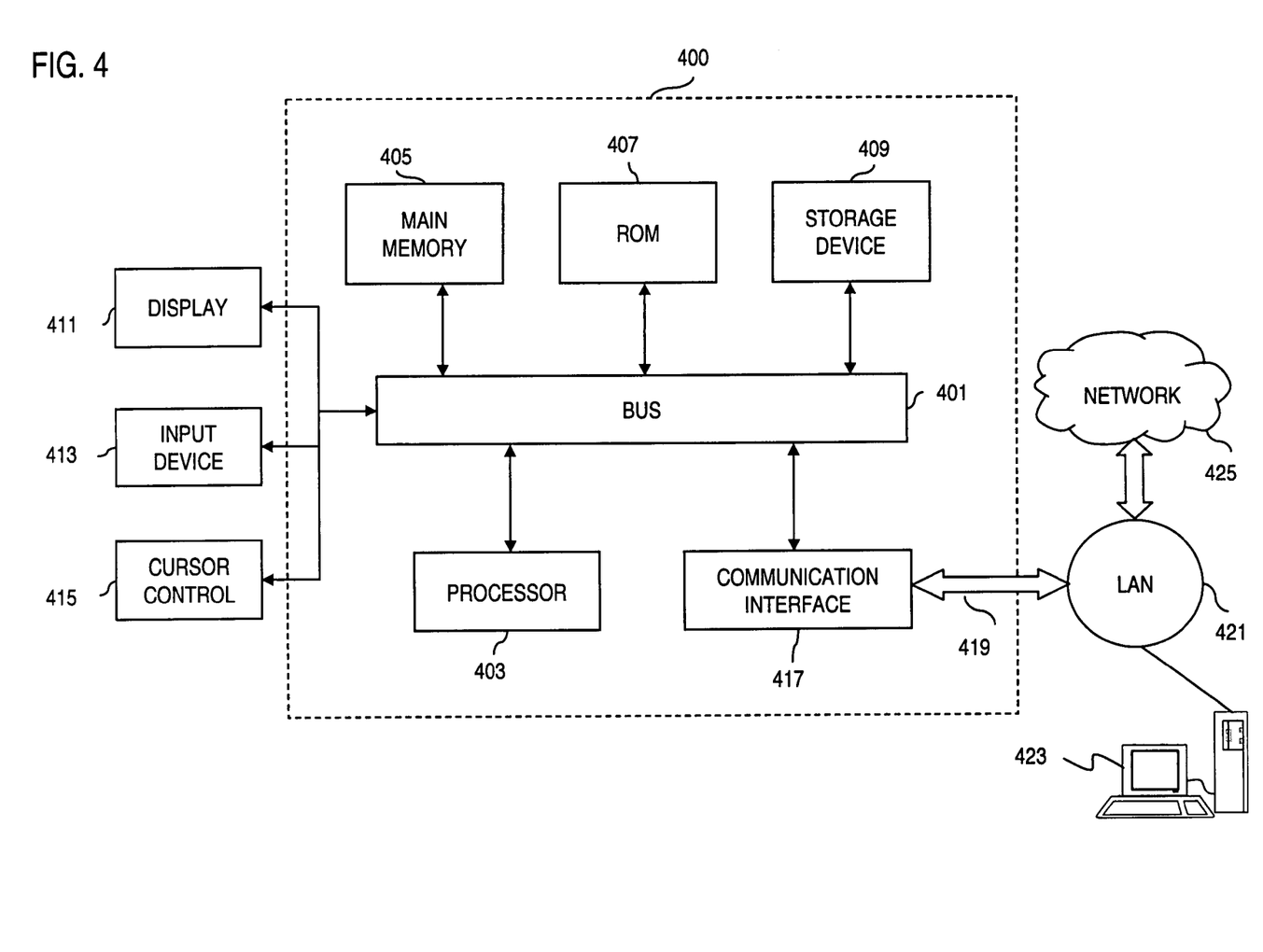
FIG. 4 is a diagram of a computer system that can be used to implement an embodiment of the present invention.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, the processes of FIGS. 2 and 3 are provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and network 425 both use electrical, electromagnetic, or optical signals to convey information and instructions. The signals through the various networks and the signals on network link 419 and through communication interface 417, which communicate digital data with computer system 400, are exemplary forms of carrier waves bearing the information and instructions.

The computer system 400 can send messages and receive data, including program code, through the network(s), network link 419, and communication interface 417. In the Internet example, a server (not shown) might transmit requested code belonging an application program for implementing an embodiment of the present invention through the network 425, local network 421 and communication interface 417. The processor 403 may execute the transmitted code while being received and/or store the code in storage device 49, or other non-volatile storage for later execution. In this manner, computer system 400 may obtain application code in the form of a carrier wave.

The term "computer-readable medium" as used herein refers to any medium that participates in providing instructions to the processor 403 for execution. Such a medium may take many forms, including but not limited to non-volatile media, volatile media, and transmission media. Non-volatile media include, for example, optical or magnetic disks, such as storage device 409. Volatile media include dynamic memory, such as main memory 405. Transmission media include coaxial cables, copper wire and fiber optics, including the wires that comprise bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Accordingly, the present invention provides an approach for directly terminating LNP calls to facilities operated by an interexchange carrier using a Service Control Point (SCP), thereby advantageously better utilizing the interexchange carrier network and reducing local access fees. The SCP provides numerous alternative routes other than termination at a local exchange carrier network; these alternative routes can include DALs, wireless connections, cable connections, etc. The above approach advantageously enhances network efficiency, while reducing operational costs.

While the present invention has been described in connection with a number of embodiments and implementations, the present invention is not so limited but covers various obvious modifications and equivalent arrangements, which fall within the purview of the appended claims.

What is claimed is:

1. A method of processing a call, the method comprising:
receiving a query from a switch associated with a service provider for an instruction for terminating the call, wherein the service provider includes an interexchange carrier;
determining whether the call is a local number portability (LNP) call; and
if the call is a LNP call, selectively instructing, in response to the query, the switch to terminate the call without incurring a local access charge for the call assessable by a local carrier capable of terminating the call,
wherein the call is terminated over a Dedicated Access Line (DAL) circuit of the service provider.

2. A method according to claim 1, further comprising:
specifying that the call is alternatively to be terminated over a communication mechanism including one of a wireless communication channel, a Voice over IP (Internet Protocol) session, or a cable communication channel.

3. A method according to claim 2, wherein the communication mechanism is unavailable to terminate the call, the method further comprising:
instructing the switch to terminate the call over another communication mechanism different from the communication mechanism.

4. A method according to claim 3, wherein the step of instructing the switch is iteratively performed until an available communication mechanism exists or an overflow condition is determined whereby the call is routed over a local carrier network.

5. A method according to claim 1, wherein the query in the receiving step is a Service Control Point (SCP) query.

6. A computer-readable medium carrying one or more sequences of one or more instructions for processing a call, the one or more sequences of one or more instructions including instructions which, when executed by one or more processors, cause the one or more processors to perform the steps of:

receiving a query from a switch associated with a service provider for an instruction for terminating the call, wherein the service provider includes an interexchange carrier;

determining whether the call is a local number portability (LNP) call; and if the call is a LNP call, selectively instructing, in response to the query, the switch to terminate the call without incurring a local access charge for the call assessable by a local carrier capable of terminating the call, wherein the call is terminated over a Dedicated Access Line (DAL) circuit of the service provider.

7. A computer-readable medium according to claim 6, wherein the one or more processors further perform the step of:

specifying that the call alternatively is to be terminated over a communication mechanism including one of a wireless communication channel, a Voice over IP (Internet Protocol) session, or a cable communication channel.

8. A computer-readable medium according to claim 7, wherein the communication mechanism is unavailable to terminate the call, and the one or more processors further perform the step of:

instructing the switch to terminate the call over another communication mechanism different from the communication mechanism.

9. A computer-readable medium according to claim 8, wherein the step of instructing the switch is iteratively performed until an available communication mechanism exists or an overflow condition is determined whereby the call is routed over a local carrier network.

10. A computer-readable medium according to claim 6, wherein the query in the receiving step is a Service Control Point (SCP) query.

11. A method for routing a call over an interexchange carrier network, the method comprising:

receiving the call destined for a station directly reachable by the interexchange carrier network;

transmitting a query to a call processor configured to provide service intelligence relating to the call, the query requesting information for routing the call to the station, wherein the call processor determines that the call is a local number portability (LNP) call; and receiving a response to the query form the call processor, the response containing the routing information for selectively bypassing a local exchange carrier network serving the station.

12. A method according to claim 11, wherein the routing information in the step of receiving the response includes termination of the call over a communication mechanism including one of a Dedicated Access Line (DAL), a wireless communication channel, a Voice over IP (Internet Protocol) session, or a cable communication channel.

13. A method according to claim 12, wherein the communication mechanism is unavailable to terminate the call, the method further comprising:

transmitting another query to the call processor for another communication mechanism different from the communication mechanism.

14. A method according to claim 13, wherein the step of transmitting the other query is iteratively performed until an available communication mechanism exists or an overflow condition is determined whereby the call is routed over a local carrier network.

15. A method according to claim 11, wherein the query in the transmitting step is a Service Control Point (SCP) query.

16. A computer-readable medium carrying one or more sequences of one or more instructions for routing a call over an interexchange carrier network, the one or more sequences of one or more instructions including instructions which, when executed by one or more processors, cause the one or more processors to perform the steps of:

receiving the call destined for a station directly reachable by the interexchange carrier network;

transmitting a query to a call processor configured to provide service intelligence relating to the call, the query requesting information for routing the call to the station, wherein the call processor determines that the call is a local number portability (LNP) call; and receiving a response to the query from the call processor, the response containing the routing information for selectively bypassing a local exchange carrier network serving the station.

17. A computer-readable medium according to claim 16, wherein the routing information in the step of receiving the response includes termination of the call over a communication mechanism including one of a Dedicated Access Line (DAL), a wireless communication channel, a Voice over IP (Internet Protocol) session, or a cable communication channel.

18. A computer-readable medium according to claim 17, wherein the communication mechanism is unavailable to terminate the call, and the one or more processors further perform the step of:

transmitting another query to the call processor for another communication mechanism different from the communication mechanism.

19. A computer-readable medium according to claim 18, wherein the step of transmitting the other query is iteratively performed until an available communication mechanism exists or an overflow condition is determined whereby the call is routed over a local carrier network.

20. A computer-readable medium according to claim 16, wherein the query in the transmitting step is a Service Control Point (SCP) query.

21. A telecommunication system for call processing, the system comprising:

a call processor communicating with a switch and being configured to provide an alternative route for a call, received by the switch, that is determined to be a local number portability (LNP); and a database coupled to the call processor for storing the alternative route among a plurality of alternative routes associated with the LNP call, the alternative route specifying bypass of a local exchange network capable of terminating the call, wherein the switch is operated by an interexchange carrier and the alternative route includes a circuit of the interexchange carrier for directly terminating the call.

22. A system according to claim 21, wherein the circuit is a Dedicated Access Line (DAL), and the alternative route further includes termination- over a communication mechanism including one of a wireless communication channel, a Voice over IP (Internet Protocol) session, or a cable communication channel.

23. A system according to claim 21, wherein the call processor repeatedly provides another one of the alternative routes until an available alternative route is determined or an overflow condition is determined whereby the call is routed over a local carrier network.

24. A system according to claim 21, wherein the query in the receiving step is a Service Control Point (SCP) query.

25. A telecommunication system for processing a call, the system comprising:
- means for communicating with a switch and for providing an alternative route for a call, received by the switch, that is determined to be a local number portability (LNP); and
- means for storing the alternative route among a plurality of alternative routes associated with the LNP call, the alternative route specifying bypass of a local exchange network capable of terminating the call,
- wherein the switch is operated by an interexchange carrier and the alternative route includes a circuit of the interexchange carrier for directly terminating the call.

26. A system according to claim 25, wherein the circuit is a Dedicated Access Line (DAL), and the alternative route further includes termination over a communication mechanism including one of a wireless communication channel, a Voice over IP (Internet Protocol) session, or a cable communication channel.

27. A system according to claim 25, wherein the means for communicating repeatedly provides another one of the alternative routes until an available alternative route is determined or an overflow condition is determined whereby the call is routed over a local carrier network.

28. A system according to claim 25, wherein the query in the receiving step is a Service Control Point (SCP) query.

* * * * *